(12) United States Patent
Hammen

(10) Patent No.: US 7,828,279 B2
(45) Date of Patent: Nov. 9, 2010

(54) DOCUMENT TRANSPORT APPARATUS

(75) Inventor: Donald W. Hammen, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 64 days.

(21) Appl. No.: 12/276,641

(22) Filed: Nov. 24, 2008

(65) Prior Publication Data

US 2010/0127447 A1    May 27, 2010

(51) Int. Cl.
  *B65H 5/22*    (2006.01)
  *B65H 63/00*   (2006.01)
  *B65H 85/00*   (2006.01)
(52) U.S. Cl. .................. 271/3.14; 271/3.17; 271/176
(58) Field of Classification Search ............... 271/3.14, 271/3.17, 176; 399/367, 371; 358/488, 498
  See application file for complete search history.

(56) References Cited

U.S. PATENT DOCUMENTS

| | | | |
|---|---|---|---|
| 4,959,685 A | 9/1990 | Kato | |
| 5,181,705 A * | 1/1993 | Ueda et al. | 271/3.15 |
| 5,366,217 A | 11/1994 | Tokuno et al. | |
| 5,938,191 A | 8/1999 | Morrison et al. | |
| 6,182,964 B1 * | 2/2001 | Tanaka et al. | 271/199 |
| 6,378,864 B1 | 4/2002 | Iesaka | |
| 6,491,492 B1 | 12/2002 | Cook | |
| 6,626,428 B2 | 9/2003 | Soga et al. | |
| 7,370,861 B2 * | 5/2008 | Aoyagi et al. | 271/176 |
| 2006/0051146 A1 | 3/2006 | Sato et al. | |
| 2006/0181018 A1 * | 8/2006 | Van Soest | 271/314 |
| 2008/0158621 A1 * | 7/2008 | Hamada et al. | 358/498 |
| 2008/0304116 A1 * | 12/2008 | Lee | 358/498 |
| 2009/0009829 A1 * | 1/2009 | Katsuyama | 358/498 |
| 2009/0303554 A1 * | 12/2009 | Otaka | 358/488 |

* cited by examiner

*Primary Examiner*—David H Bollinger
(74) *Attorney, Agent, or Firm*—Andrew J. Anderson; Nelson A. Blish

(57) ABSTRACT

A method of scanning documents obtains the document that is to be scanned from an input tray, transports the document at a transport velocity past a scanner to obtain image data therefrom, and stacks each scanned document aligned with trailing-edge registration in a sloped output tray, in the order of scanning, by a sequence that detects the trailing edge of the scanned document, feeds the leading edge of the scanned document from an exit nip in a forward direction and above the sloped output tray at a transport velocity, then changes the speed at the exit nip to an exit velocity, different from the transport velocity, according to the timing of the trailing edge detection. The trailing edge of the scanned document is ejected at the exit velocity. The exit nip speed is restored to the transport velocity for feeding the leading edge of a subsequent document.

10 Claims, 17 Drawing Sheets

DOCUMENT TRANSPORT APPARATUS

FIELD OF THE INVENTION

The present invention generally relates to document imaging devices and more particularly relates to a document transport apparatus for ordered stacking of scanned documents of various sizes.

BACKGROUND OF THE INVENTION

Document transport systems are used in a wide range of document handling devices, including printers, copiers, scanners, fax machines and the like. In the design and implementation of document transport mechanisms, considerable attention is paid to handling documents to avoid damage, to prevent jamming or mis-positioning, to maximize throughput and efficiency, and to stack the output documents in a form that is convenient for operator handling.

The design of any particular document transport system is directly related to the larger purpose of the apparatus that processes the document. For printers and copiers, for example, the document transport system is designed for efficient handling of large volumes of paper documents, wherein the documents for any particular printer or copier job are most often of the same size and weight. Optimization of this paper path is generally directed to speed and efficiency of operation. Output feed mechanisms of such systems, for example, often propel the completed document outward so that it strikes a retaining wall or structure with some force, using this type of arrangement to provide a uniform stacking.

Facsimile machines and many types of low-cost office scanners are primarily designed for scanning images from standard letter-sized paper sheets (8.5×11 in. or metric A4). However, more capable scanners are expected to handle documents of various sizes, including stacks of documents in which successive documents can be of different weights and dimensions. For example, a governmental office may need to scan folders having mixed document content, such as licenses, title forms, canceled checks or credit card payment slips, signed forms, and miscellaneous communications, where documents in any folder can be of various sizes and weights. For handling mixed document stacks such as these, there are at least two particularly notable challenges for the document transport apparatus:

(i) Must handle documents of different size, such as length, and weight in succession as part of the same scanning job. With documents of inconsistent size and weight, the document transport apparatus must handle and provide these documents in an orderly, consistent manner.

(ii) Must preserve the document stacking order. This is increasingly important, particularly, for example, where a stack of documents relates to a property transaction, dispute or procedural process, or other legal matter. With many document stacks, the scanner must provide, in its output tray, the stacked documents in the same document stacking order as they were placed in the input tray. If this is not done properly, an operator may be required to re-sort documents back into order manually, which adds cost and the risk of operator error.

Although the problems described in (i) and (ii) have been recognized by scanner designers, existing approaches for their solution have been disappointing or constraining due to mechanical complexity and expense. Some scanners, for example, employ the conventional leading-edge output stacking arrangement that is often used by high-speed copiers. Although such a system can be adapted so that it handles documents of different size and weights as just described in (i), it can perform poorly as related to requirement (ii), often failing to maintain the order of documents, particularly where smaller documents such as checks, index cards, or deposit slips are interleaved with larger documents.

One type of solution that has been used for maintaining document order is a stacker, such as the movable document stacker used in a copier and described, for example, in U.S. Pat. No. 6,378,864 entitled "Stacker" to Iesaka. However, stackers add considerable expense and mechanical complexity, and often require careful operator handling in order to put the document stack back into correct order. Another solution that has been used for maintaining stacking order with a stack of mixed-size documents is a stacking wheel, sometimes termed a "money wheel", that receives a document, rotates at least partially to flip the document, then cooperates with a device that strips the document from the wheel and drops it onto an output tray or elevator. As the very description suggests, the stacking wheel approach can be mechanically complex and relatively costly, and adds to the size and overall mechanical footprint of the scanning system.

U.S. Pat. Nos. 4,959,685 and 6,626,428 describe sheet ejection mechanisms for image forming apparatuses wherein imaged sheet ejection speeds may be controlled to be different from sheet transport speeds in other sections of the apparatus. There is no teaching with respect to a scanner apparatus capable of handling a stack of multiple documents of different sizes and weights and of maintaining the order of such a stack of documents at the conclusion of a scanning process.

Thus, it is seen that there is a need for a document transport apparatus that is capable of handling multiple documents of different sizes and weights and of maintaining the document stacking order at the conclusion of the scanning process.

SUMMARY OF THE INVENTION

It is an object of the present invention to advance the art of document transport, particularly for scanner apparatus that handle documents of mixed sizes. With this object in mind, the present invention provides a method of scanning at least first and second documents comprising repeating, for each document, the steps of:

obtaining the document that is to be scanned, leading edge first, from an input tray;

transporting the document at a transport velocity past a scanner to obtain image data therefrom; and stacking each scanned document aligned with trailing-edge registration in a sloped output tray, in the order of scanning, by a sequence that comprises:

detecting the trailing edge of the scanned document;

feeding the leading edge of the scanned document from an exit nip in a forward direction and above the sloped output tray at a transport velocity;

changing the speed of the document transport at the exit nip to an exit velocity, different from the transport velocity, according to the timing of the trailing edge detection;

ejecting the trailing edge of the scanned document from the exit nip at the exit velocity; and restoring speed the exit nip to the transport velocity for feeding the leading edge of a subsequent document from the exit nip at the transport velocity.

It is a feature of the present invention that it employs a combination of transport system timing and passive stacking elements in order to provide document transport and preserve document stacking order.

It is an advantage of the present invention that it handles documents of different sizes, and in particular different lengths, while preserving document stacking order.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS,

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art. In a number of cases, figures provided in this disclosure are presented in order to emphasize structure, function, and interaction of components and may be drawn without attention to scale or to precise location of various support components.

Embodiments of the present invention use a combination of edge-sensing, transport timing and velocity adjustments, and output tray design in order to provide a document transport apparatus for a scanner that preserves document order within a document stack. When a stack of documents in given order is provided as input to the scanning apparatus of the present invention, the same order of documents is provided in the output stack. Subsequent material initially describes overall system operation, then provides a more detailed description of timing and mechanical factors that each play a part in providing a document transport system that preserves document order.

Figure 1:
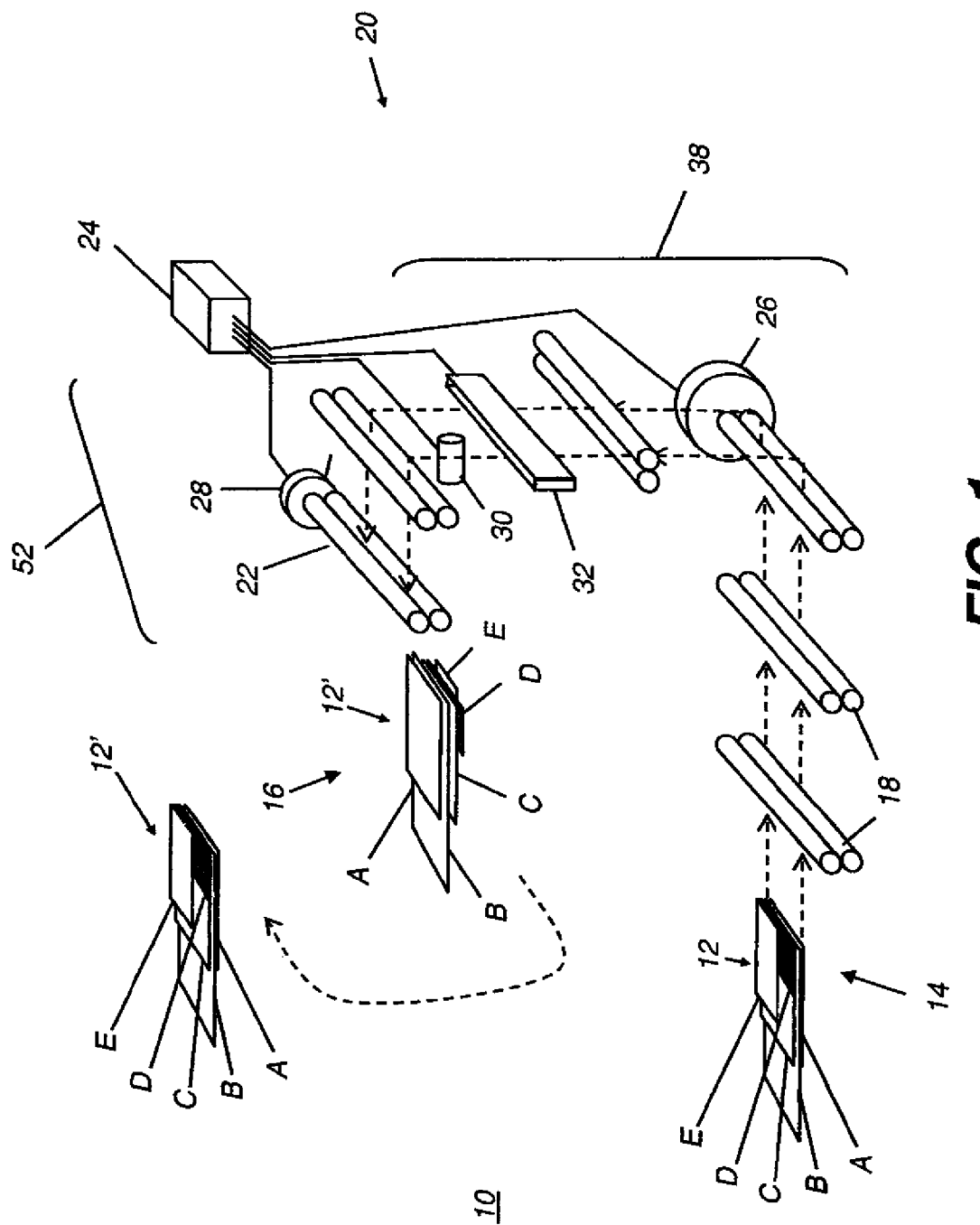
FIG. 1 is a schematic block diagram of a scanner apparatus having a document transport system according to one embodiment of the present invention.

Referring to the schematic diagram of FIG. 1, there is shown a document transport system 20 of a scanner apparatus 10 that provides document handling according to embodiments of the present invention. Document transport system 20 has a document transport apparatus 38 that moves documents for scanning at a transport velocity and an exit transport apparatus 52 that moves scanned documents and, during document exit, changes between the transport velocity and an exit velocity. A document stack 12 contains multiple documents of different sizes, stacked in order. At the start of scanning, a document stack 12 lies in an input tray 14. Documents A, B, C, D, and E are stacked in order in the example shown. Conventional document feed mechanisms in document transport apparatus 38 can be used to obtain documents from the input tray, leading edge first, and feed them into the document transport path. At the conclusion of the scanning process, a document stack 12' lies face down in an output tray 16. Because of the overall "C"-shaped document transport path, scanned document stack 12', when removed and flipped over as shown in FIG. 1, has the same document A, B, C, D, and E order as it originally did when in input tray 14.

Still referring to FIG. 1, components of transport system 20 use paired rollers 18 or other devices for transporting documents past a scanner 32. A first motor 26 drives document transport apparatus 38 of transport system 20. A sensor 30, operatively part of exit transport apparatus 52, provides a signal when the trailing edge of a document is detected. This signal, processed by a control logic processor 24, is then used to adjust the timing of operation of an exit nip transport 22 that ejects the scanned document into output tray 16. After the appropriate edge of the document is detected at sensor 30, control logic processor 24 controls the speed of a second motor 28 at exit nip transport 22.

Figure 2:
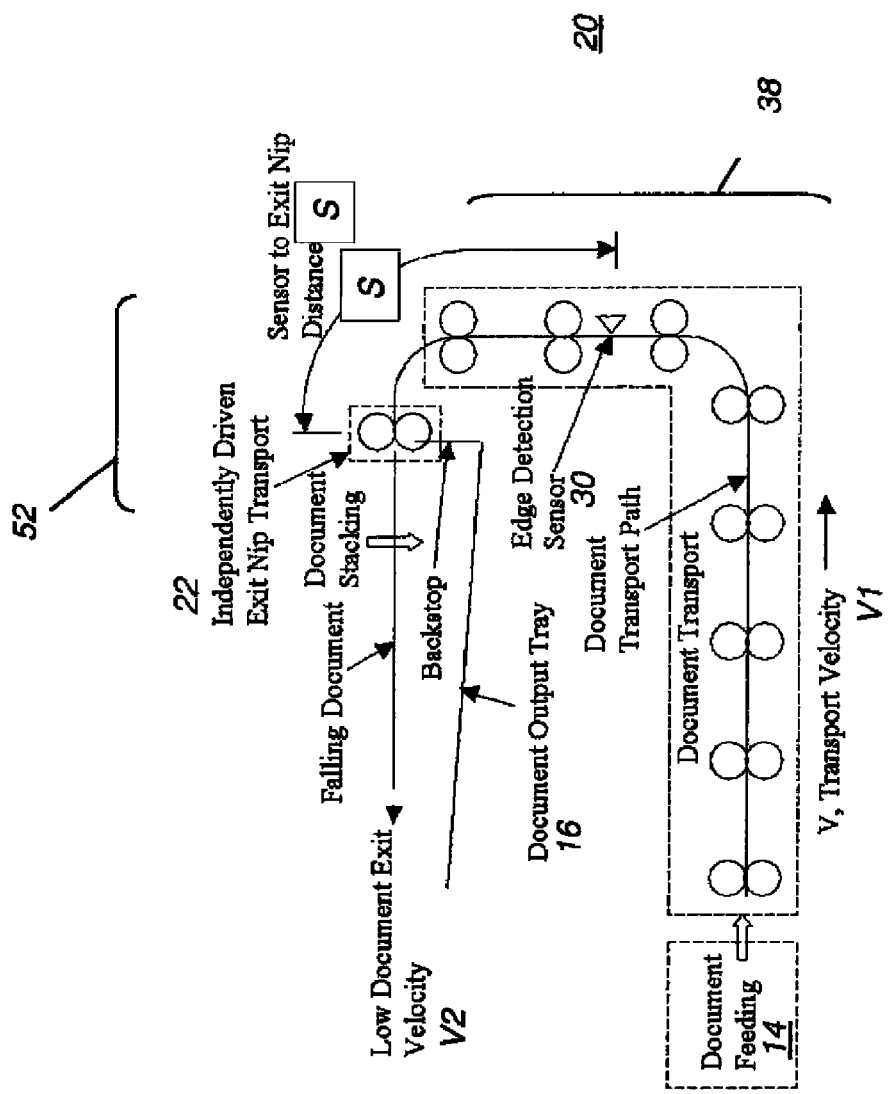
FIG. 2 is a schematic side view showing the document path in a document transport system according to an embodiment of the present invention.

The side view schematic diagram of FIG. 2 shows other features of the C-shaped document transport path for transport system 20 in one embodiment. As shown in FIG. 2, there are two different document velocities that are used: a transport velocity V1 that is used for directing the document past scanner 32 (FIG. 1) and an exit velocity V2 that is intended for orderly handling and stacking of scanned documents in output tray 16. Output tray 16 has a sloped arrangement of surfaces that provide trailing-edge alignment, described in more detail subsequently. A distance S between sensor 30 and the exit nip at exit nip transport 22 is important for the computation that controls the timing of document delivery from the output nip. It should be noted that sensor 30, while operatively part of exit transport apparatus 52, may be positioned at any suitable point along the transport path for the document.

Embodiments of the present invention operate by transporting each document along the document transport path of FIGS. 1 and 2 at a first transport speed, termed the transport velocity. At exit nip transport 22, this speed is changed to an exit velocity. This change in output feed speed of motor 28, between that required for transport and exit velocities for the document respectively, helps to provide improved document stacking at the output. In some embodiments, such as those described in more detail subsequently, the exit velocity is reduced from the transport velocity. This change in speed before the document descends into output tray 16 can reduce the likelihood of folding or other handling problem in some cases and is advantaged for providing trailing edge alignment in the embodiments described herein. However, the exit velocity can alternately be increased over the transport velocity, which may offer advantages when employing very slow transport speeds.

Figure 3:
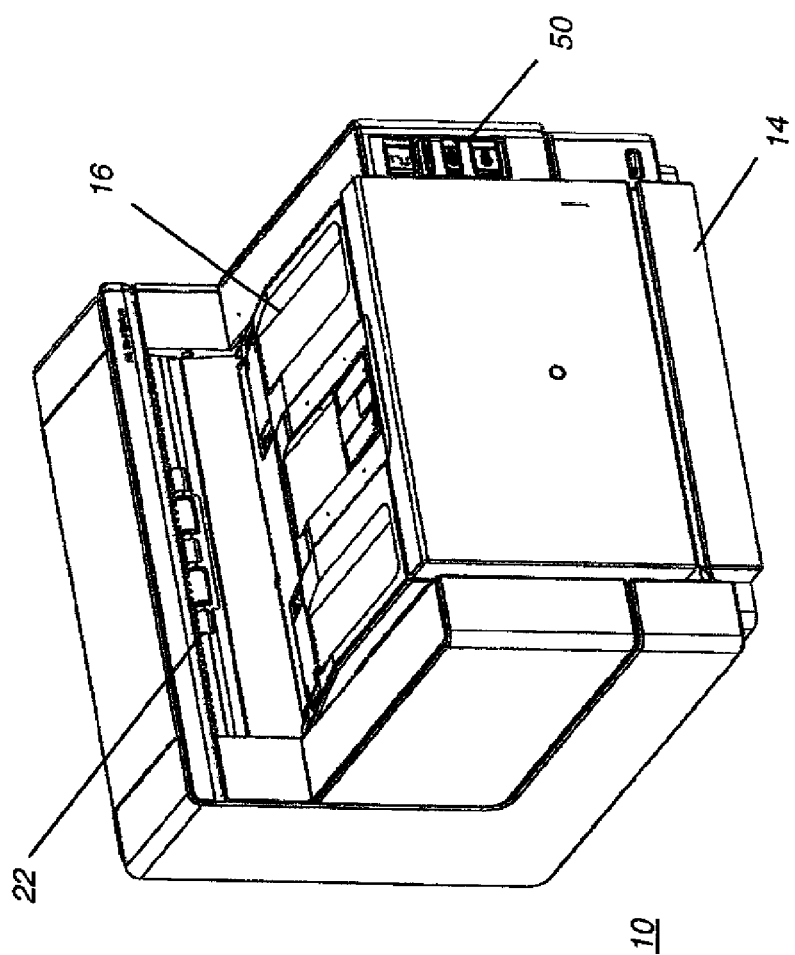
FIG. 3 is a perspective view of a document scanner showing input and output tray locations.
Figure 4A:
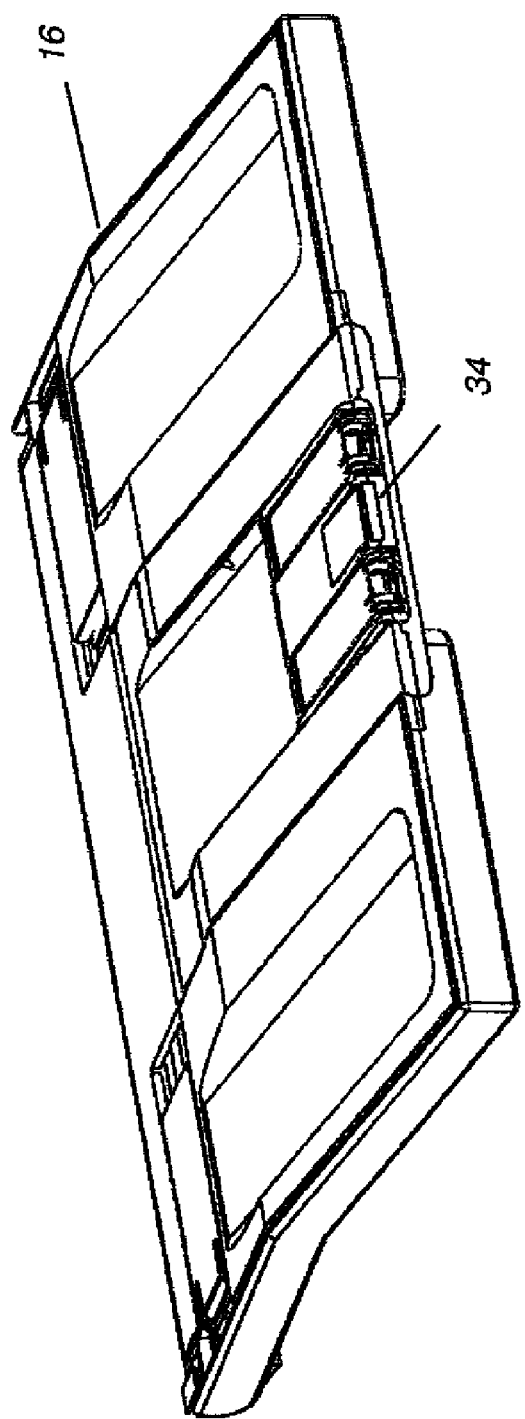
FIGS. 4A, 4B, 4C, 4D, and 4E show perspective and side views of an output tray in an embodiment of the present invention.
Figure 4B:
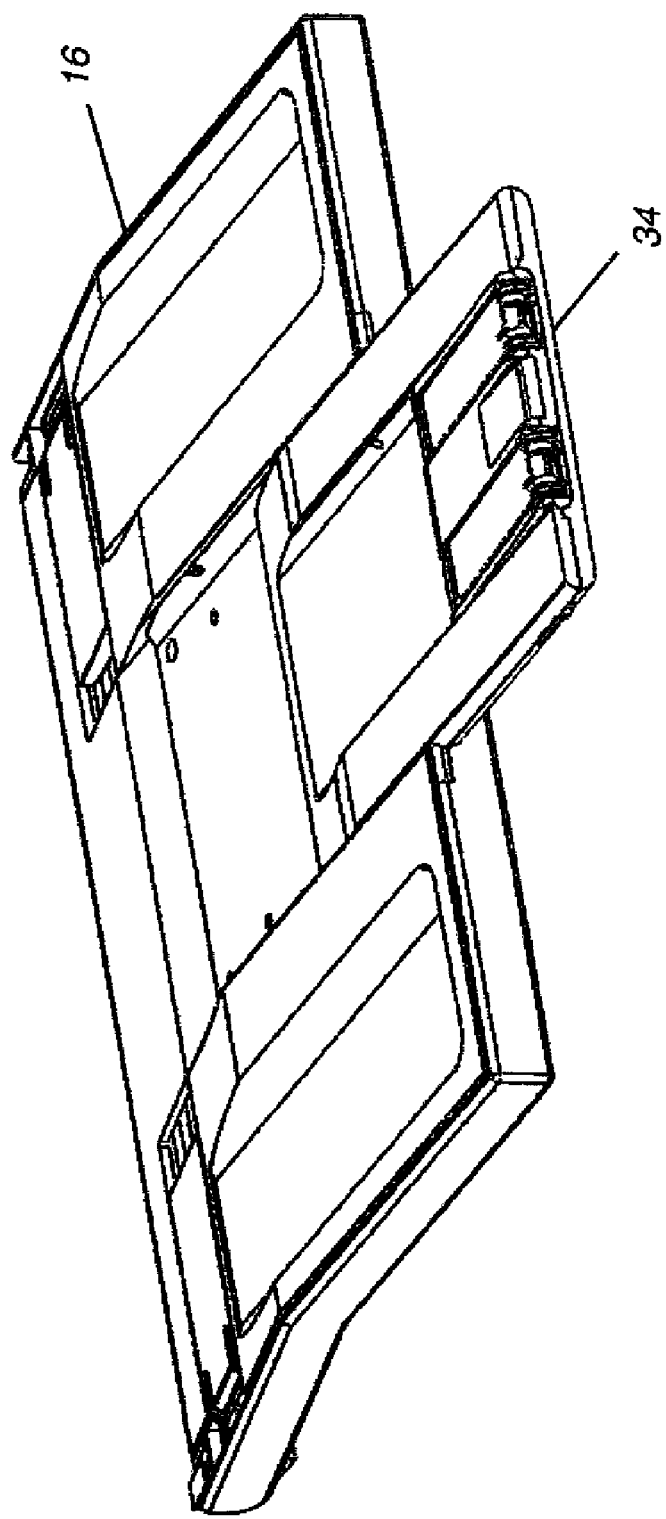
Figure 4C:
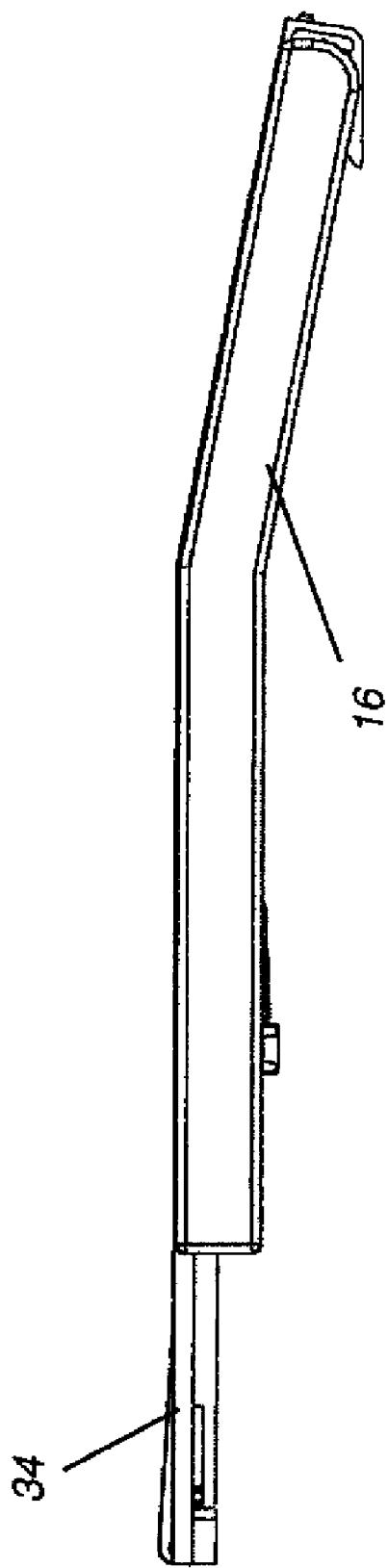
Figure 4D:
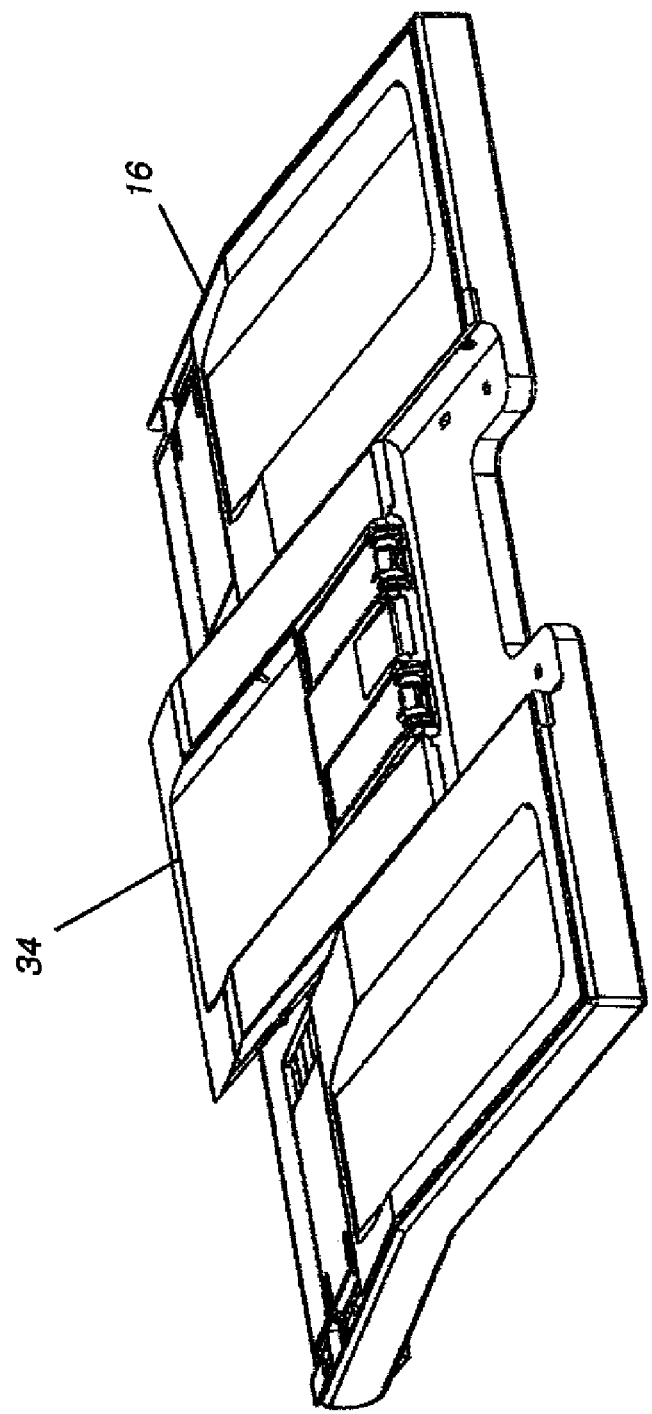
Figure 4E:
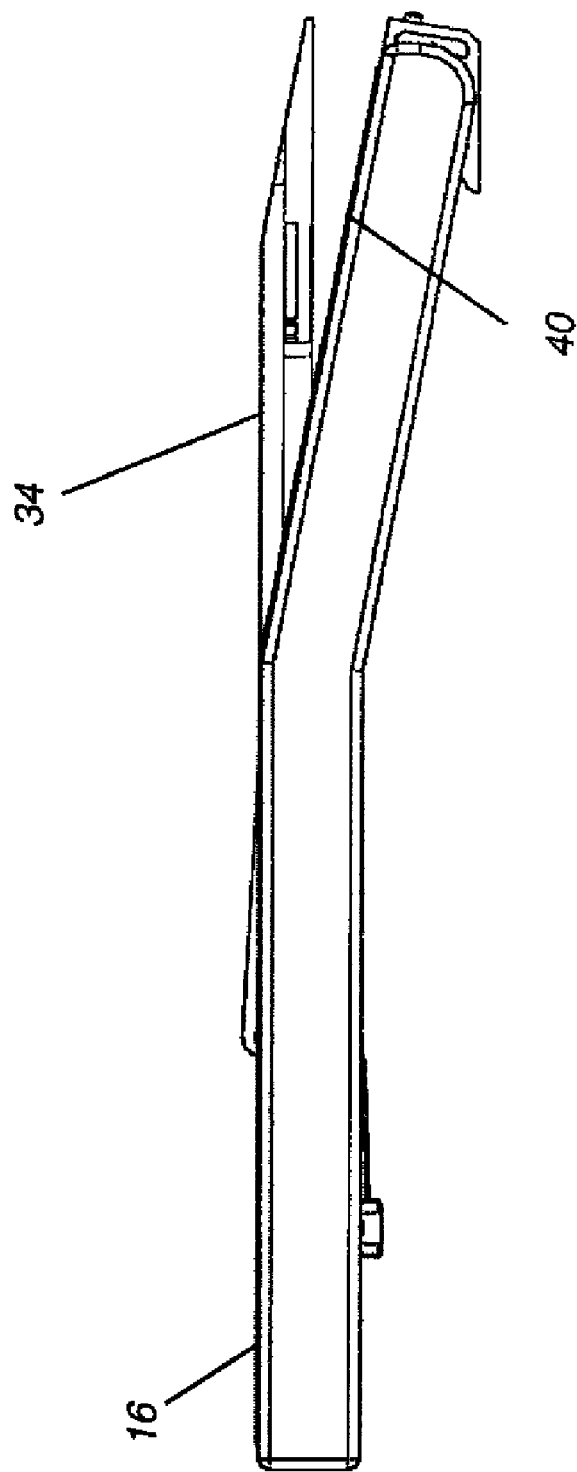

FIG. 3 shows scanner apparatus 10 in an embodiment with input tray 14 folded upwards. An optional control panel 50 accepts operator commands for scanner operation. Output tray 16, as shown in FIGS. 4A through 4E, can be adapted to handling documents of different maximum sizes. FIG. 4A shows output tray 16 in a position for handling conventional letter-sized documents in one embodiment. FIG. 4B and the side view of FIG. 4C show an optional sled 34 that slides outward from output tray 16 in order to handle longer documents. As shown in FIG. 4D and in the side view of FIG. 4E, sled 34 can optionally be retracted so that it provides a different surface contour for output tray 16.

Figure 5:
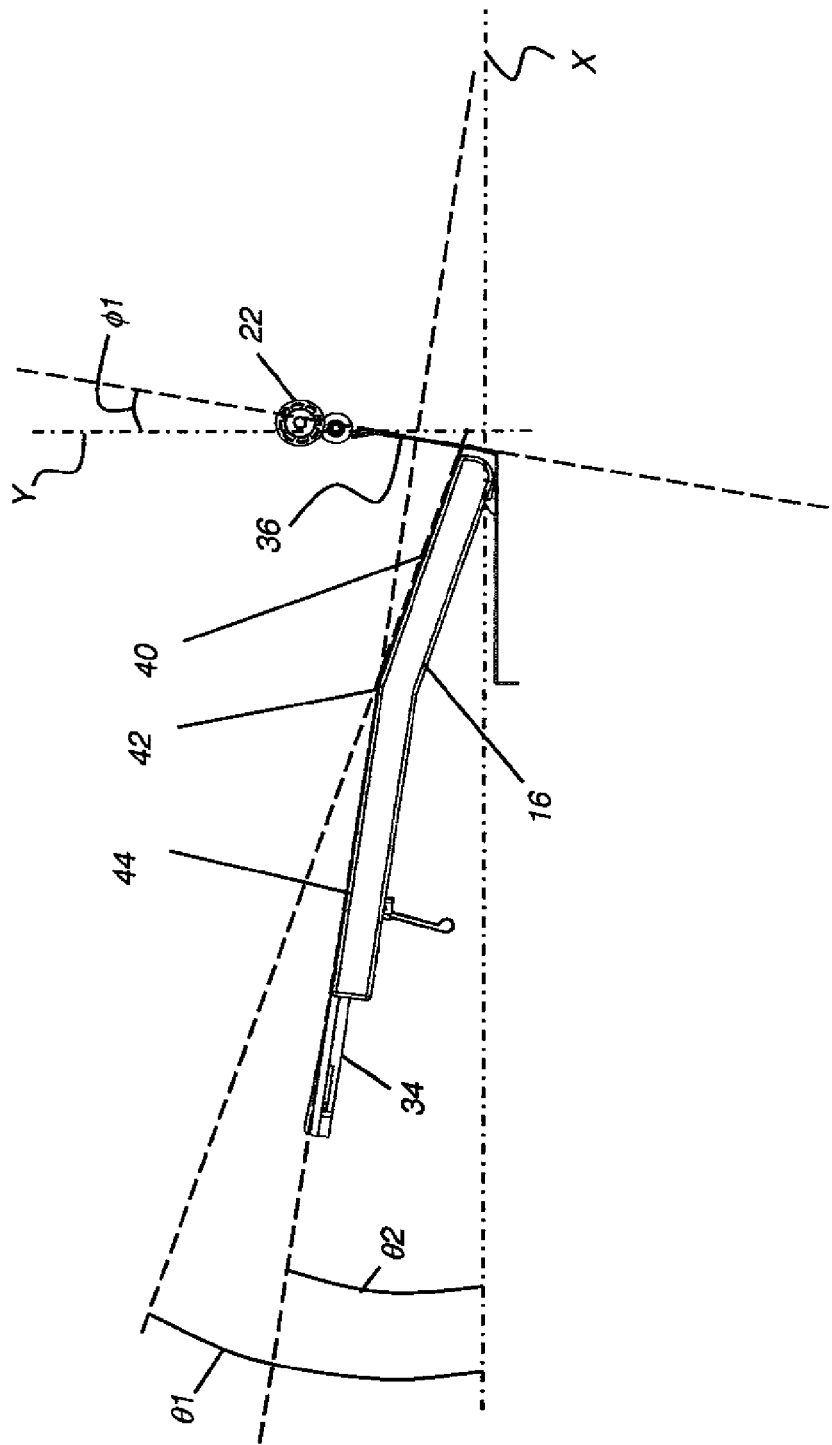
FIG. 5 is a side view of an output tray showing angular and geometric relationships of interest for output document handling.

FIG. 5 shows aspects of output tray 16 that are of particular interest for preserving document stacking order in scanner apparatus 10 in one embodiment. All of the surfaces that come into contact with any portion of the document are at oblique angles, that is, offset by at least some non-zero amount from horizontal and vertical. The trailing edge of a document that has been ejected from exit nip transport 22 registers against a tapered back wall 36 with this arrangement, shown at a non-zero angle $\phi 1$ relative to vertical Y. Optionally, the surface of output tray 16 has two portions 40 and 44 having different non-zero slopes, separated by a breakpoint 42 in this cross-sectional view. Sloped portion 40 that is nearest to back wall 36 has a slope at non-zero angle $\theta 1$ relative to horizontal, shown as X. Sloped portion 44 has a lesser slope at non-zero angle $\theta 2$ from horizontal. With this configuration, a document of shorter length, such as a check or 3×5 index card, for example, lands on the surface of output tray 16, or on the surface of a previously scanned document already in output tray 16, at a steeper incline than does a standard length document, such as a standard letter-sized sheet, thus providing improved ordered stacking with trailing edge registration. There is thus less likelihood of loss of document order with this arrangement than with conventional scanner document exit and stacking systems.

Referring back to FIG. 4E, one additional function of sled 34 is shown. When retracted to this position, moved toward back wall 36 (FIG. 5), sled 34 shortens the length of sloped portion 40. This can be useful, for example, when scanning small, lightweight documents, such as checks.

Figure 6A:
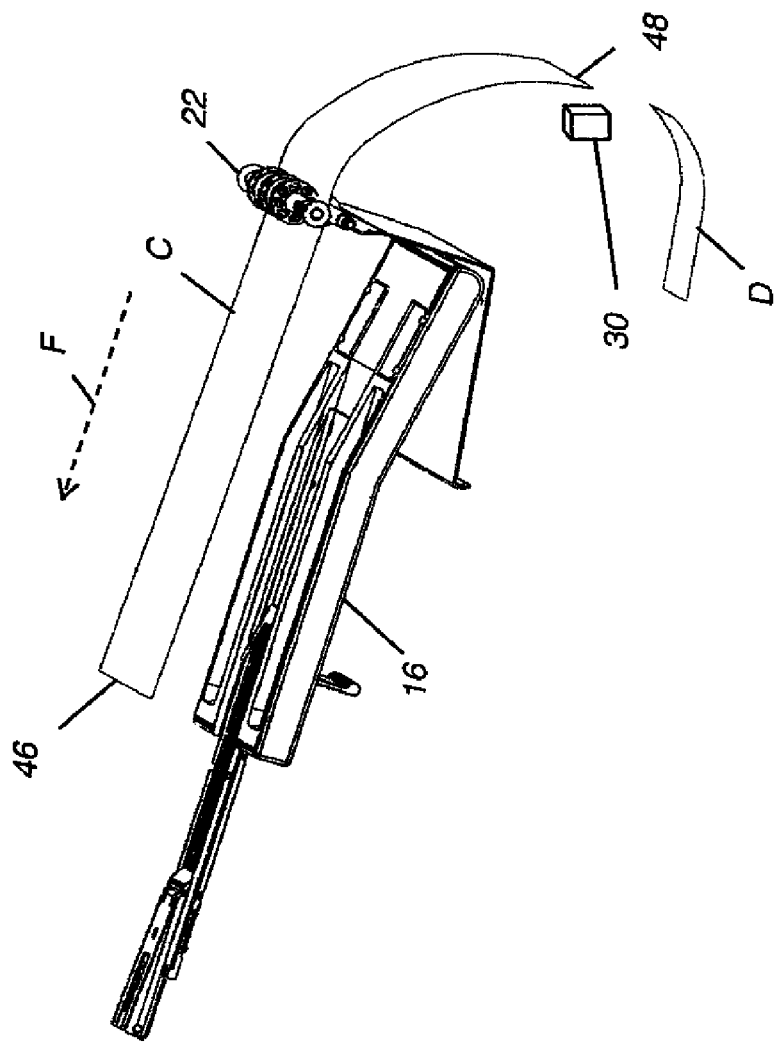
FIGS. 6A, 6B, 6C, 6D, 6E, and 6F show a sequence of operation for document handling at the output tray according to an embodiment of the present invention.
Figure 6B:
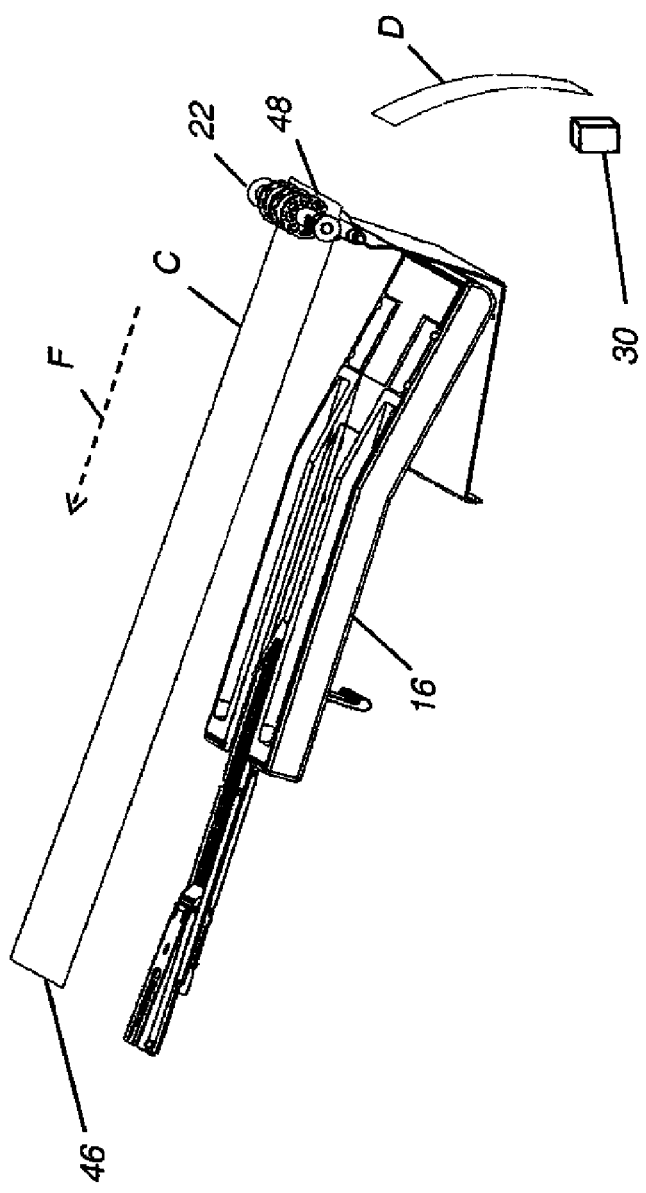

FIGS. 6A through 6F show, for one embodiment, the sequence for document handling of documents C and D by exit transport apparatus 52 at exit nip transport 22 and output tray 16, as controlled by control logic processor 24 (FIG. 1). Document C has a leading edge 46 and a trailing edge 48. Leading edge 46 is fed from exit nip transport 22 in a forward direction, shown as F in FIG. 6A and following. FIG. 6A also shows trailing edge 48 moving past sensor 30. Some type of edge sensing, such as optical or contact sensing for example, can be used to detect the relative position of document C along the document transport path. As is described in more detail subsequently, the timing of document C movement, based on edge detection and on distance between sensor 30 and the exit nip in the embodiment shown, is used by control logic processor 24 to change the speed of motor 28 (FIG. 1) and, accordingly, to adjust the speed at which trailing edge 48 of document C emerges from exit nip transport 22. FIG. 6B shows document C as acceleration or deceleration to exit velocity occurs, with trailing edge 48 moving very near exit nip transport 22. The next document in sequence, document D, is shown moving past trailing-edge sensor 30 at the same time. It should be observed that sensor 30, although shown near exit nip transport 22 in FIGS. 6A-F, can be positioned at any suitable location along the document transport path, so that it may detect the trailing edge of a document well before it reaches the exit nip. There may be any number of intermediate documents in motion between the sensor 30 position and the exit nip, so that detection information is saved until needed to establish the timing for an individual document.

Figure 6C:
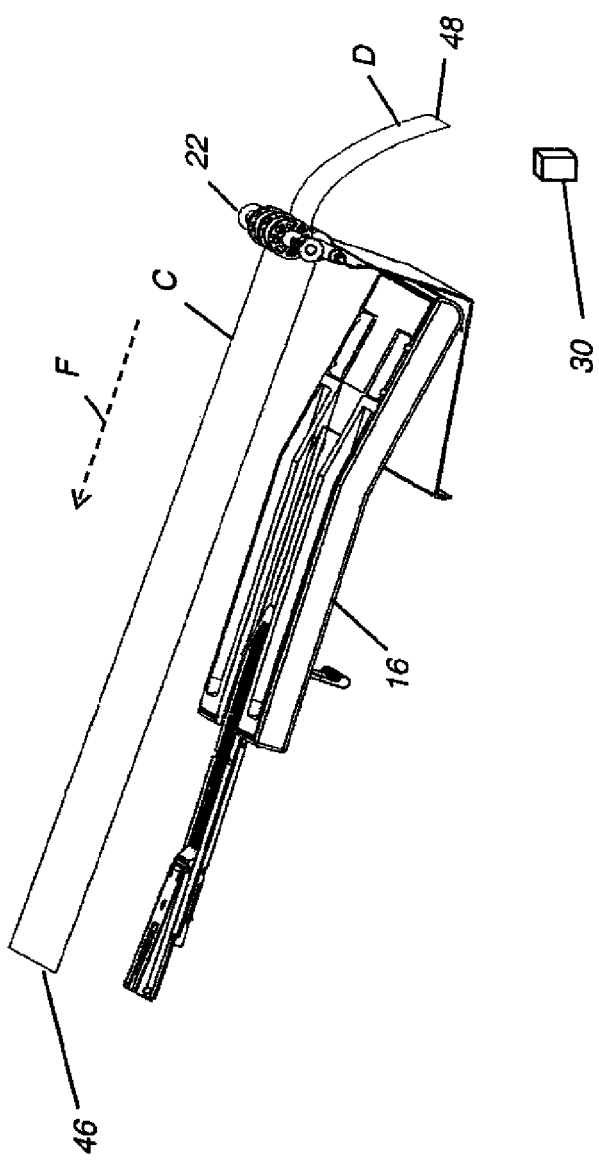

FIG. 6C shows document C as it has just emerged from exit nip transport 22, before dropping downwards into output tray 16. In the embodiment of FIGS. 6A-F, exit velocity is reduced from transport velocity. Once motor 28 of exit transport apparatus 52 (FIG. 1) has slowed, the F-direction velocity of document C is reduced compared to its transport velocity throughout the rest of transport system 20.

Figure 6D:
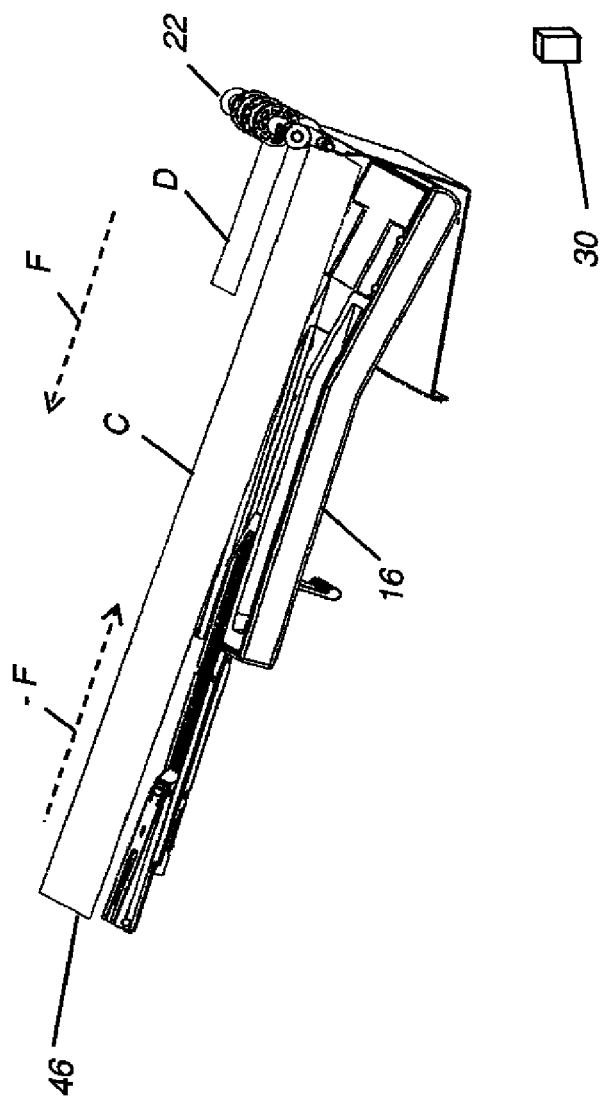

FIG. 6D shows document C as it drops downwards towards output tray 16. Because it has been slowed significantly in its forward course, document C does not tend to shoot forward in output tray 16. An optional deflector or retaining mechanism (not shown) may also be provided to slow or block forward movement of document C at its leading edge; if used, such a mechanism should be sized to accommodate the longest document in the stack that is being scanned. Shorter document D, meanwhile, has moved through exit nip transport 22 at the faster transport velocity and is now slowed to the exit velocity as its trailing edge nears the exit nip.

Figure 6E:
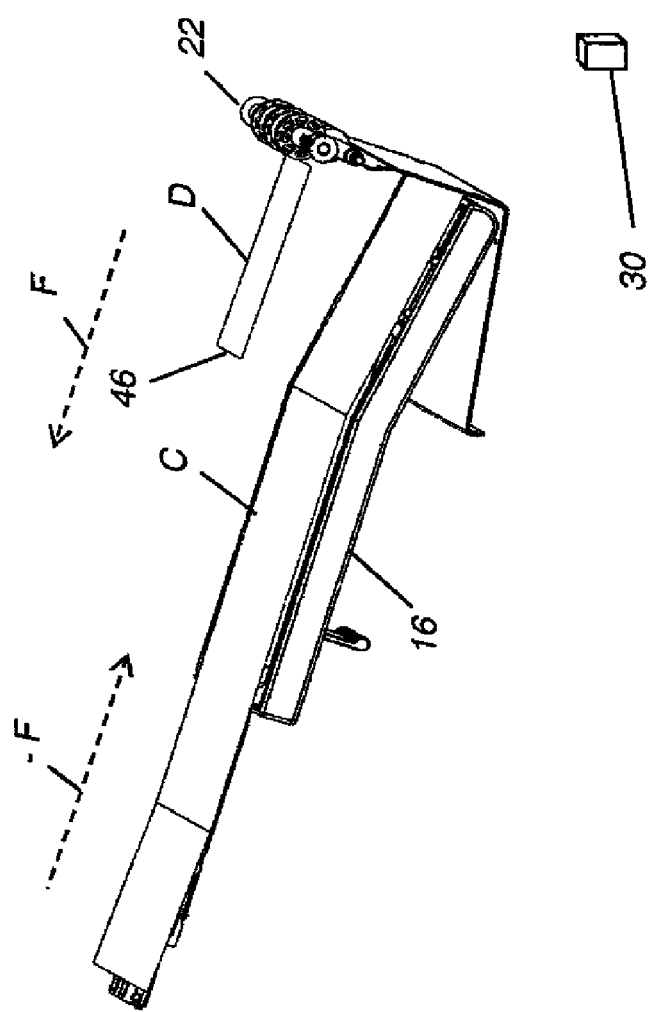

FIG. 6E shows that document C has landed in output tray 16. The slope of output tray 16 causes document C to drift backward, in the −F direction as shown, so that its trailing edge 48 seats against tapered back wall 36. The next item, document D, has just exited exit nip transport 22 and begun its descent into output tray 16.

Figure 6F:
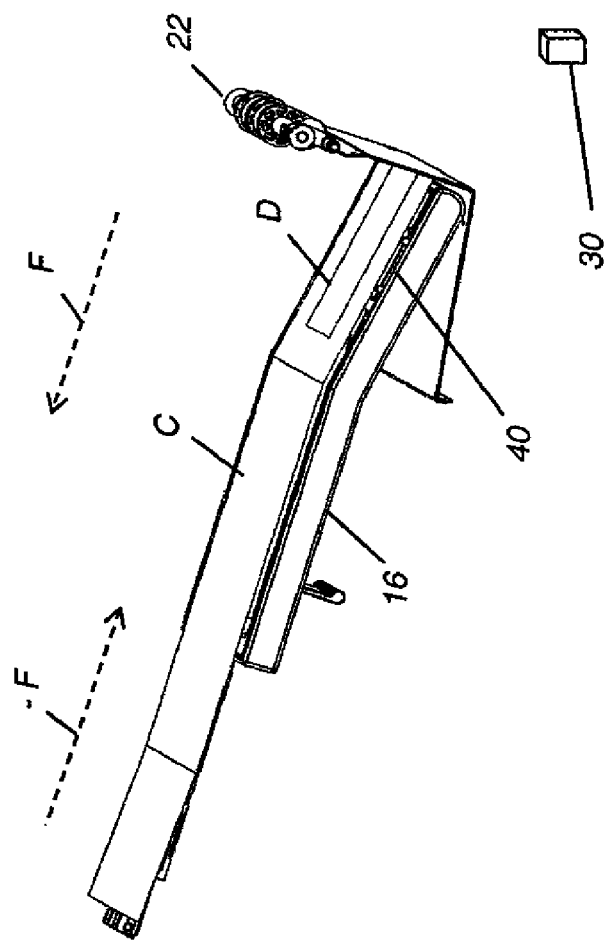

FIG. 6F shows document D stacked atop document C, with both documents aligned with trailing-edge registration. This figure shows the particular advantage that sloped portion 40 provides for guiding the shorter document back against back wall 36.

Figure 7:
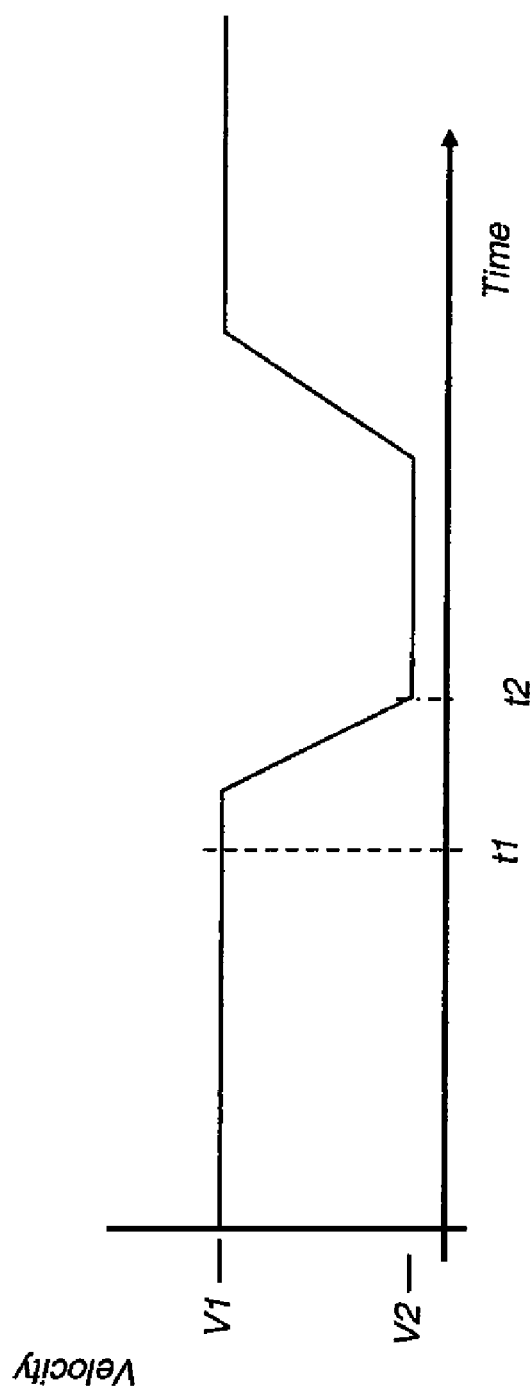
FIG. 7 is a timing diagram showing velocity at the output nip for document handling in an embodiment of the present invention.

The timing diagram of FIG. 7 shows the relative change in velocity controlled by exit transport apparatus 52 for document handling at exit nip transport 22 in one embodiment in which exit velocity V2 is reduced from transport velocity V1. At a time t1, sensor 30 detects an edge of the document, as was described earlier with reference to FIG. 6B. The transport speed V1 is known, as well as the sensor-to-nip distance S, allowing control logic processor 24 (FIG. 1) to estimate arrival time of the document at the nip. At some time t2 later than time t1, the transport speed at exit nip transport 22 is changed to a lower exit velocity V2, so that trailing edge 48 of the document is dropped into output tray 16 rather than moving too far forward, as was described earlier with reference to FIGS. 6C through 6F. After the document is exited, the faster transport velocity V1 is then restored for nip movement. It should be noted that at least some portion of the deceleration shown in FIG. 7 occurs while the scanned document is within the exit nip. Thus, in embodiments of the present invention, the speed with which the scanned document is being fed through the exit nip changes while the document is within the exit nip.

Figure 8:
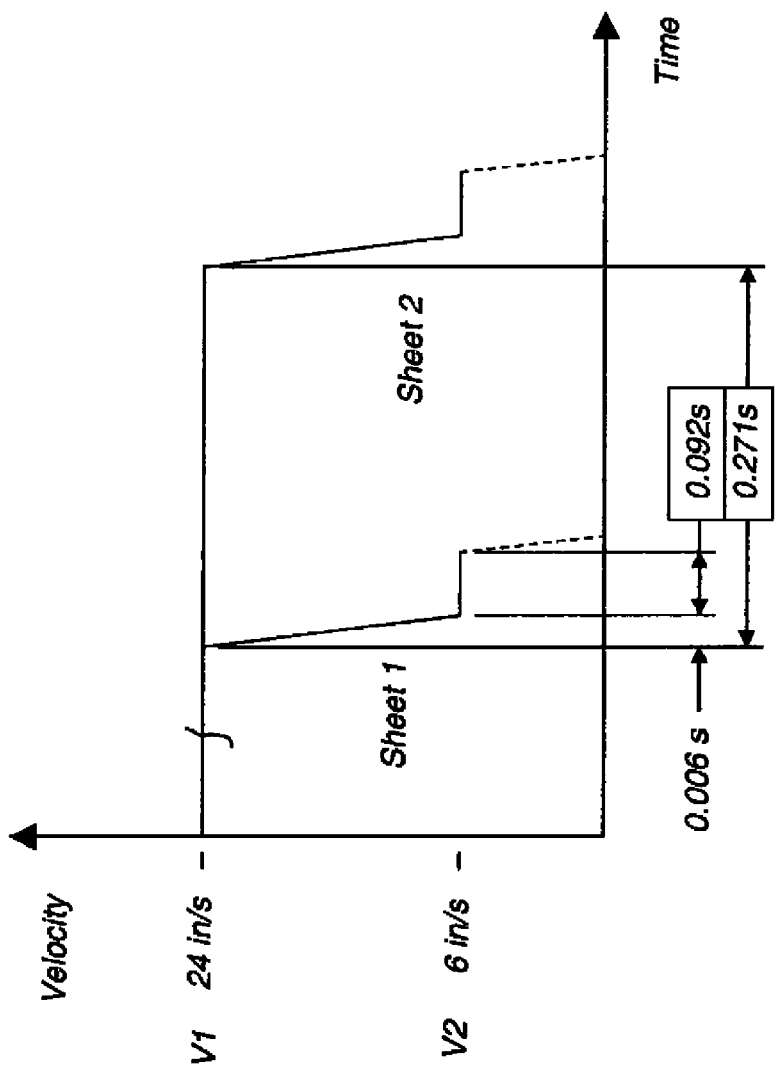
FIG. 8 is a timing diagram showing output nip velocity for two successive scanned documents according to one embodiment of the present invention.

FIG. 8 is a timing diagram showing document velocity for two successive scanned documents according to one embodiment of the present invention. In this example, the transport velocity is 24 inches/sec; the exit velocity of the output drive mechanism is reduced to 6 inches/sec. Sheet 1 is of arbitrary length; sheet 2 is 4 inches in length, with a 2.5 inch gap between these sheets. The dashed lines indicate the document velocity as it leaves the exit nip and drops toward the output tray. Deceleration time 0.006 sec., is exemplary and may vary, according to the difference between the transport velocity and the exit velocity, for example. Factors used to determine the length of time for acceleration or deceleration to the exit velocity V2 and duration of time at that velocity include the difference between the transport velocity and the exit velocity.

A number of observations can be made from the sequence shown in FIG. 1 and the document handling examples shown in FIGS. 6A-6F and the related timing diagrams of FIGS. 7 and 8, including:

(i) Position sensing for the document. The embodiments shown and described in the present disclosure use trailing-edge detection for controlling the timing of velocity control at exit nip transport 22. This arrangement is particularly advantaged because it is the trailing edge of the document that must be ejected at the lower velocity. Various edge detection sensors can be used and can be placed in any of a variety of positions between the document feeder at input tray 14 and the exit nip.

(ii) Trailing-edge registration. The trailing edge of the ejected document backs up against tapered back wall 36. This arrangement helps to keep documents in order within the stack. This trailing-edge registration method can be favorably compared against more conventional approaches for ordered document stacking that use leading-edge alignment, particularly where documents of different length are to be stacked. With conventional leading-edge alignment, shorter documents can easily be jostled out of place by longer documents. This problem is much less likely with trailing-edge registration as used in embodiments of the present invention.

(iii) Dual-speed operation at the exit nip. Motor 28 of exit transport apparatus 52 (FIG. 1) is actuable at two speeds. A first output speed supports movement of the scanned document through exit nip transport 22 at the transport velocity, and is the speed used during most of its operating time. Intermittently, following detection of the trailing edge of a document and computation of its arrival time at the exit nip, motor 28 is decelerated or accelerated to a second output speed, so that the trailing edge of the document is ejected at an exit velocity. Then, the exit transport must be quickly accelerated or decelerated to restore the first output speed to receive the next document traveling at the transport velocity V1.

Transport system 20 of the present invention allows scanner apparatus 10 to handle documents having different sizes and weights, with reduced likelihood of changing the order of documents from that of the original document stack. By changing the forward movement of the document moments before it is released to drop into the output tray, the method of the present invention allows gravity and appropriately sloped surface portions of output tray 16 to maintain an orderly and ordered stacking of scanned documents and is particularly advantaged for handling documents of different dimensions, retaining their original stacking order.

In one embodiment, transport system 20 itself may operate at more than one transport velocity V1, using one of a set of velocities selectable by the operator on a user interface such as scanner control panel 50 (FIG. 3) or set using some other device. The exit velocity V2 can similarly be varied to have two or more selectable rates, so that it is compatible with document scanning and handling. For example, there are embodiments in which document scanning itself is slowed, such as where higher spatial resolution or bit-depth resolution is needed or where there is significant color content that must be captured. In some embodiments, where the document transport velocity (V1) is similar to, or even lower than, the preferred exit transport (V2) velocity for exit stacking, it may not be useful to change the output velocity of exit nip transport 22. Instead, the same velocity is used throughout the transport path, so that V1=V2. In other embodiments, with V1 slower than the desired V2, the exit nip may be accelerated to V2. In one embodiment, scanner speeds are set according to instructions entered by the operator using control panel 50.

Computing the position of the trailing edge of a scanned document is fairly straightforward, since both the document transport velocity and the distance between edge sensor 30 and the exit nip is known. It should be noted that control logic processor 24, represented in FIG. 1, could be embodied in any of a number of ways and might use one or more computers or dedicated microprocessors or other types of programmed logic devices for computation, tracking, and control.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, the precise locations of image scanning components, sensors, motors, and drive components can be varied from those shown in the examples. A variety of methods could be used for changing transport speed at exit nip sport 22, including braking mechanisms as well as variable speed motors.

Thus, what is provided is a document transport system and method for ordered stacking of scanned documents of various sizes.

PARTS LIST

10. Scanner apparatus
12, 12' Document stack
14. Input tray
16. Output tray
18. Roller
20. Transport system
22. Exit nip transport
24. Control logic processor
26. Motor
28. Motor
30. Sensor
32. Scanner
34. Sled
36. Back wall
38. Document transport apparatus
40. Sloped portion
42. Break point
44. Sloped portion
46. Leading edge.
48. Trailing edge
50. Control panel
52. Exit transport apparatus
A, B, C, D, E. Document
F. Forward direction
−F. Backward direction
S. Distance
X. Horizontal
Y. Vertical
t1, t2. Time
$\phi 1, \theta 1, \theta 2$. Angle

What is claimed is:

1. A method of scanning at least first and second documents comprising repeating, for each document, the steps of:
    obtaining the document that is to be scanned, leading edge first, from an input tray;
    transporting the document at a transport velocity past a scanner to obtain image data therefrom;
    stacking each scanned document aligned with trailing-edge registration in a sloped output tray, in the order of scanning, by a sequence that comprises:
    detecting the trailing edge of the scanned document;
    feeding the leading edge of the scanned document from an exit nip in a forward direction and above the sloped output tray at a transport velocity;

changing the speed of the document transport at the exit nip to an exit velocity, different from the transport velocity, according to the timing of the trailing edge detection;

ejecting the trailing edge of the scanned document from the exit nip at the exit velocity;

restoring speed at the exit nip to the transport velocity for feeding the leading edge of a subsequent document from the exit nip at the transport velocity; and wherein the exit velocity is slower than the transport velocity.

2. A method of scanning at least first and second documents comprising repeating, for each document, the steps of:

obtaining the document that is to be scanned, leading edge first, from an input tray;

transporting the document at a transport velocity past a scanner to obtain image data therefrom;

stacking each scanned document aligned with trailing-edge registration in a sloped output tray, in the order of scanning, by a sequence that comprises:

detecting the trailing edge of the scanned document;

feeding the leading edge of the scanned document from an exit nip in a forward direction and above the sloped output tray at a transport velocity;

changing the speed of the document transport at the exit nip to an exit velocity, different from the transport velocity, according to the timing of the trailing edge detection;

ejecting the trailing edge of the scanned document from the exit nip at the exit velocity;

restoring speed at the exit nip to the transport velocity for feeding the leading edge of a subsequent document from the exit nip at the transport velocity; and wherein the output tray comprises at least first and second sloped portions that guide the trailing edge of the scanned document backward against a tapered rear wall, wherein the first sloped portion of the output tray nearest the tapered rear wall is disposed at a first angle relative to horizontal and wherein the second sloped portion extends outward from the first sloped portion and is disposed at a second angle, wherein the first angle is steeper than the second angle.

3. The method of claim 2 wherein the output tray further comprises an adjustable member that is positionable to change the length of the first sloped portion.

4. A method of scanning at least first and second documents comprising repeating, for each document, the steps of:

obtaining the document that is to be scanned, leading edge first, from an input tray;

transporting the document at a transport velocity past a scanner to obtain image data therefrom;

stacking each scanned document aligned with trailing-edge registration in a sloped output tray, in the order of scanning, by a sequence that comprises:

detecting the trailing edge of the scanned document;

feeding the leading edge of the scanned document from an exit nip in a forward direction and above the sloped output tray at a transport velocity;

changing the speed of the document transport at the exit nip to an exit velocity, different from the transport velocity, according to the timing of the trailing edge detection;

ejecting the trailing edge of the scanned document from the exit nip at the exit velocity;

restoring speed at the exit nip to the transport velocity for feeding the leading edge of a subsequent document from the exit nip at the transport velocity; and wherein the transport velocity is taken from a set having multiple values.

5. The method of claim 4 wherein the transport velocity is selectable according to an operator instruction.

6. The method of claim 4 wherein the transport velocity is changed in accordance with scanning resolution.

7. A method of scanning at least first and second documents comprising repeating, for each document, the steps of:

obtaining the document that is to be scanned, leading edge first, from an input tray;

transporting the document at a transport velocity past a scanner to obtain image data therefrom;

stacking each scanned document aligned with trailing-edge registration in a sloped output tray, in the order of scanning, by a sequence that comprises:

detecting the trailing edge of the scanned document;

feeding the leading edge of the scanned document from an exit nip in a forward direction and above the sloped output tray at a transport velocity;

changing the speed of the document transport at the exit nip to an exit velocity, different from the transport velocity, according to the timing of the trailing edge detection;

ejecting the trailing edge of the scanned document from the exit nip at the exit velocity;

restoring speed at the exit nip to the transport velocity for feeding the leading edge of a subsequent document from the exit nip at the transport velocity; and wherein the at least first and second documents comprise first and second documents of different lengths.

8. A scanner document transport system comprising:

an input tray for holding a stack of documents of any dimension within a predetermined range of dimensions;

a document transport apparatus comprising:

a feed mechanism actuable to obtain each document, successively, from the input tray;

a first motor actuable to provide motion for a feed path that directs each obtained document individually past a scanner at a transport velocity;

an exit transport apparatus comprising:

an edge-sensor disposed to provide a signal indicating the trailing edge of the scanned document;

a second motor actuable at a first output feed speed to direct the leading edge of the scanned document in a forward direction through an exit and above a sloped output tray at the transport velocity and, according to the timing of the edge-sensor signal, actuable at a second output feed speed to eject the trailing edge of the scanned document through the exit in the forward direction above the output tray at an exit velocity; and wherein the second output feed speed is slower than the first output feed speed.

9. A scanner document transport system comprising:

an input tray for holding a stack of documents of any dimension within a predetermined range of dimensions;

a document transport apparatus comprising:

a feed mechanism actuable to obtain each document, successively, from the input tray;

a first motor actuable to provide motion for a feed path that directs each obtained document individually past a scanner at a transport velocity;

an exit transport apparatus comprising:

an edge-sensor disposed to provide a signal indicating the trailing edge of the scanned document;

a second motor actuable at a first output feed speed to direct the leading edge of the scanned document in a forward direction through an exit and above a sloped output tray at the transport velocity and, according to the timing of the edge-sensor signal, actuable at a second output feed speed to eject the trailing edge of the scanned document through the exit in the forward direction above the output tray at an exit velocity; and wherein the output tray surface has at least a first portion at a first slope and a second portion at a steeper slope and disposed to guide the trailing edge of the scanned document in a backward direction into alignment against a tapered back wall.

10. The system of claim 9 where the output tray further comprises a movable portion that adjusts the length of either the first or second portion of the output tray surface.

* * * * *